Patented Mar. 28, 1950

2,502,347

UNITED STATES PATENT OFFICE 2,502,347

PRODUCTION OF TITANIUM DIOXIDE

Holger H. Schaumann, Newark, Del., assignor to E. I. du Pont de Nemours & Company, Wilmington, Del., a corporation of Delaware No Drawing. Application July 11, 1947, Serial No. 760,489

11 Claims. (Cl. 23—202)

This invention relates to the preparation of titanium oxide and more particularly to the production of titanium dioxide pigment through reaction of a titanium halide vapor with an oxygen-containing gas.

The production of titanium dioxide from titanium salts has long been practiced in the industry, but large scale operations have been limited to the hydrolysis of aqueous solutions, particularly solutions of titanium sulphate. The use of titanium chloride has also been proposed and has been the subject of numerous patents. Anhydrous titanium tetrachloride, as well as other titanium halides, may be volatilized, and this fact has led to the added possibility of the formation of titanium dioxide by a vapor phase reaction. By reacting any of these titanium halide vapors with oxygen, the oxide may be formed along with free halogen. This method has been generally referred to as the vapor phase oxidation process. A somewhat similar process has been proposed in which the tetrahalide is reacted with water vapor, and this produces the oxide and the corresponding hydrogen halide. The former process is the more interesting one commercially, since it allows the recovery of the halogen as the element, whereas the reaction with water vapor gives a compound which is of much less value for reuse in a cyclic process.

A study of processes involving the oxidation of the tetrahalides of titanium and particularly titanium tetrachloride has disclosed many disadvantages, including the tendency of the solid titanium dioxide to stick to the walls of the reaction vessel with the resulting production of coarse products. It has been proposed to shield the oxidation jet or burner with a stream of pure nitrogen so as to delay the oxidation until after the gases are out of contact with the surfaces of the apparatus. This means a dilution of the recovered gas and the disadvantages which go with the recovery of dilute chlorine.

More recently, it has been found that the properties of the titanium dioxide produced are influenced by the presence of a minor amount of a reagent such as moisture in the reacting gases. The control of the water content of the gases entering the reaction chamber has made it possible to regulate the production of pigments of high quality and specifically the production of excellent rutile pigments. The addition of moisture to the oxidation reaction has a definite disadvantage, that being the loss of chlorine in the system due to its conversion by the moisture to hydrogen chloride. It is true that the amount so lost may be small but since an efficient commercial operation depends on recovery and reuse of chlorine, losses as the above, even though minor, exert an influence on the value of the process.

The avoidance of the above mentioned disadvantages which are inherent in the prior art vapor phase oxidation processes, is a prime object of this invention. A further object is to produce a pigment of controlled crystal structure and controlled particle size, and more particularly to produce finely divided rutile pigment free from coarse gritty particles. A still further object is the production of by-product chlorine gas which is well suited for return to the system, for reuse in the production of more titanium tetrachloride, and which is characterized by freedom from combined chlorine.

The above and other objects are accomplished by my invention which broadly comprises the vapor phase oxidation of a halide of titanium, the halogen having an atomic number greater than 9, in the presence of an oxide of nitrogen. In a specific embodiment of my invention, preheated titanium tetrachloride is rapidly mixed with a preheated oxygen-containing gas containing as an essential ingredient a minor amount of an oxide of nitrogen. The admixture of these two gases is accompanied by reaction wherein the titanium halide is converted to titanium dioxide through oxidation. During reaction, the oxide of nitrogen is reduced to gaseous nitrogen and the halide is converted to a free halogen gas. It is advantageous to use an oxidizing gas comprising large amounts of free oxygen along with a minor amount of an oxide of nitrogen, since the latter is the more expensive ingredient and need only be present for its influence on the main body of the reaction, which is between the titanium halide and free oxygen.

My investigations on the effect of oxides of nitrogen on the vapor phase oxidation process for the production of titanium dioxide pigment have led me to believe that these compounds exert an influence similar to that which has recently been found regarding the use of water vapor. The latter reacts very rapidly with titanium tetrachloride as well as other halides of titanium such as the iodide and the bromide. It is believed that due to the greater reactivity of the water vapor, nuclei are formed when the halide vapors are mixed with oxygen having moisture present therein, and this is followed by the main reaction which is oxidation of the halides. These nuclei are believed to act as growth centers for the pigment particles, and accordingly the nuclei have a great influence on the properties of the final product. The oxides of nitrogen are also more reactive than pure oxygen in the formation of titanium dioxide from vaporous titanium tetrachloride. It therefore seems that the oxides of nitrogen are also able to produce nuclei which are almost instantaneously used in the building of pigment particles and which exert a tremendous influence on the course of the oxidation reaction. The reaction between an oxide of nitrogen, whether it be nitrous oxide, nitric oxide or nitrogen dioxide, and titanium tetrachloride is more exothermic than similar reaction of pure oxygen, and this is the basis for the above explanation. The reaction mechanism is not known with certainty due to the rapidity with which the oxidation proceeds, but in any event, the reaction is more easily controlled or directed in the presence of an oxide of nitrogen, and one is able to obtain the rutile crystal form of titanium dioxide with less difficulty.

In operating my process, I find it advantageous to carry out the oxidation reaction at a temperature in excess of 900° C. and this requires the preheating of the reactants. The titanium tetrachloride may be heated through heat exchange equipment, and the same is true of the oxygen-containing gas whether it be pure oxygen, air or mixtures of pure oxygen and air. It is generally advisable to preheat these reactants to a temperature above about 600° C., and the oxide of nitrogen which is to be used in the process may be added to the oxygen-containing gas before or after preheating. A satisfactory method is to mix simultaneously within the reaction chamber a stream of preheated titanium tetrachloride, a stream which is a portion of the required preheated oxygen-containing gas and a third stream which is made up of the remainder of the required preheated oxygen-containing gas plus the oxides of nitrogen. Another modification comprises the use of only two inlets into the oxidation chamber with the oxide of nitrogen being uniformly distributed throughout the main body of the oxygen-containing gas.

To present a clearer understanding of the invention, the following examples are given, which are merely illustrative of and not intended to limit the underlying scope and principle of the invention.

*Example I*

A small mixing reaction chamber constructed of silica was used to oxidize titanium tetrachloride to titanium dioxide upon admixture with a slight excess of air. The reaction chamber had two inlets and was so constructed that rapid mixing occurred at the point of entry of the two streams of reactants. The chamber was mounted in a furnace which was maintained at approximately 1000° C. to avoid undue losses of heat during the operation and also to bring the apparatus to temperature for the start of the reaction. Titanium tetrachloride was admitted through one inlet after having been heated to a temperature of 750° C. and an amount of air 5.1 times the volume of the amount of TiCl₄ vapor was admitted through the second inlet after having been heated to 770° C.

Gaseous nitrogen dioxide was added to the air just prior to its introduction into the mixing zone, the amount being sufficient to give a mixed gas containing 99.8% air and .2% NO₂. The calculated retention time in the reaction chamber was .25 second.

The product from the reaction chamber was rapidly cooled and the suspended titanium dioxide separated from the chlorine, after which the former was treated to give a pigment product having a pH of 7.2. The product was tested for pigment properties and found to have a tinting strength of 197, a carbon black undertone of 103 and a color of 17:2y. X-ray examination showed that it was 90% rutile.

A similar reaction was carried out using no nitrogen dioxide. The reactants were similarly heated and the conditions of the operation essentially duplicated the above. The titanium dioxide product after similar finishing treatment was found to have a tinting strength of approximately 50, while the color was very poor. The superiority of the product made in the presence of nitrogen dioxide is believed due to the presence of even a minor amount of this potent oxidizing reagent.

*Example II*

Titanium dioxide was produced from titanium tetrachloride similarly to the process described in Example I, through reaction between titanium tetrachloride and commercial oxygen in the presence of a minor amount of nitrous oxide. In this instance, the titanium tetrachloride was preheated to 960° C. in silica equipment before mixing with oxygen which was similarly preheated and which had admixed a minor amount of nitrous oxide. The gaseous reactants were admitted to the reaction chamber in the ratio of 1 volume of the titanium halide to 1.21 volumes of oxygen and .124 volume of N₂O. The latter (nitrous oxide) was admitted to the oxygen just prior to the entrance of the latter into the reaction chamber. The apparatus was constructed of silica and was preheated to a temperature of 1020° C. prior to the beginning of the operation but no external heat was needed thereafter. Heat losses were avoided by suitable insulation. A reaction temperature of 1250° C. was reached during the operation and the reaction was substantially complete, giving a product of approximately 80% rutile and of quality comparable to the best pigment grade rutile heretofore marketed.

*Example III*

Titanium dioxide was produced by the oxidation of titanium tetrachloride in an apparatus similar to that described in the preceding examples, with the oxygen being supplied from nitrous oxide alone. For each volume of titanium tetrachloride vapor going into the chamber, 2.19 volumes of nitrous oxide were used. The reagents were preheated to 405° C. and 410° C. respectively. The reaction chamber was preheated to 1020° C. prior to the introduction of the reactants, but this supply of heat was discontinued upon the initiation of the reaction. During the oxidation, the reaction chamber temperature rose to 1250° C. due to the high heat of reaction. The calculated retention time in this instance, was .4 second. The recovered titanium dioxide product was a soft powder of excellent pigment properties and showed 95% rutile with 18:6y color, it being equal in this respect to the best white pigments now to be found on the market. The tinting strength (154) while quite acceptable, was not so good as produced in the operations where the main portion of the oxygen was supplied by free oxygen.

The pigment testing values referred to herein were determined in accordance with the methods described or identified in U. S. Patents 2,253,551 and 2,046,054.

In the above examples, the use of nitrous oxide and nitrogen dioxide as reagents in the oxidation of titanium tetrachloride is shown. Other oxides of nitrogen may be used and these include nitric oxide and the higher oxides such as $N_2O_3$, $N_2O_4$, and $N_2O_5$. When using the latter (higher oxides), it is understood that the compositions may be reduced by thermal decomposition down to the nitric oxide state, but in any event, an oxide of nitrogen will be entering the reactants which is more reactive than free or elementary oxygen. The heat of reaction between titanium tetrachloride and an oxide of nitrogen is greater than that in the reaction with free oxygen, and it is believed that the oxide of nitrogen is first consumed in the oxidation, thereby supplying nuclei on which further amounts of titanium dioxide may be deposited during the reaction between the titanium tetrachloride and free oxygen.

The oxygen for the formation of titanium dioxide from titanium tetrachloride in Example III is supplied by nitrogen oxide alone. It is obvious that this is an expensive supply of oxygen and the example serves mainly to emphasize the high heat of reaction when an oxide of nitrogen is used in the process. It is not necessary to use such large amounts of an oxide of nitrogen, as is shown in the preceding examples, and in fact the use of small amounts such as in Examples I and II is to be recommended. In general, I find that the improved results of my process may be had by use of from .5 volume of the oxide of nitrogen for each 100 volumes titanium tetrachloride vapor up to about 20 parts of the oxide of nitrogen per 100 parts of the titanium compound by volume, both measured under the same conditions of pressure and temperature.

The oxidation process may be conducted at temperatures similar to those shown in the prior art in the absence of my novel means of improving the operation. In general, the reaction should be carried out at a temperature above about 850° C. and even up to 1350° C. provided the product is rapidly quenched after the reaction to prevent undue and improper growth of the pigment particles. The amount of preheating to be given the reactants will depend upon the amount of oxide of nitrogen to be used, since the amount of heat generated is dependent upon the amount of oxide of nitrogen added. It will also depend upon whether pure oxygen, air enriched with oxygen, or air alone is used, since the compositions containing air carry quantities of inert nitrogen which must also be raised to the reaction temperature and which thus adsorb substantial quantities of heat.

Although titanium tetrachloride was used as the titanium halide in the preceding examples to illustrate the novel means of improving the vapor phase oxidation process, other titanium halides, namely the bromide or iodide, may be used with equivalent results. A vapor phase oxidation process utilizing titanium tetrafluoride is regarded to be inoperable because of the stability of the tetrafluoride towards oxidation and the extreme reactivity of free fluorine.

As explained above, the reaction may be carried out without the shielding of reaction chamber inlets with inert gases such as nitrogen as has been proposed in the prior art. This permits the recovery of chlorine of higher purity, which is important in such operations since an economical process depends upon the recovery and reuse of chlorine. The process has the advantage over the recently proposed method of conducting the reaction in the presence of water vapor, which also is attractive from the standpoint of producing rutile product of high quality, due to the fact that no chlorine is lost by reaction with hydrogen-containing gasses through the formation of hydrogen chloride.

As many apparently widely different embodiments of this invention may be made without departing from the spirit and scope thereof, it is understood that I do not limit myself to the specific disclosure except as defined in the appended claims.

I claim:

1. A process for the production of titanium dioxide which comprises oxidizing at an elevated temperature a vaporous titanium halide, the halogen atom of which has an atomic number greater than nine, in the presence of an added oxide of nitrogen, and recovering the $TiO_2$ from the resulting reaction products.

2. A process for the production of titanium dioxide which comprises oxidizing at an elevated temperature a preheated vaporous titanium halide, the halogen atom of which has an atomic number greater than nine, by reaction with a preheated gaseous reagent containing oxygen and an added oxide of nitrogen, anad recovering the $TiO_2$ from the resulting reaction products.

3. A process for the production of titanium dioxide which comprises oxidizing at an elevated temperature preheated vaporous titanium tetrachloride with a preheated gaseous reagent containing oxygen and an added oxide of nitrogen, and recovering the $TiO_2$ from the resulting reaction products.

4. A process for the production of pigment quality titanium dioxide which comprises the oxidation of titanium tetrachloride by a gaseous reagent containing oxygen and an added oxide of nitrogen, all gaseous reactants being preheated to maintain a reaction temperature of between about 800° and 1350° C., and recovering the $TiO_2$ from the resulting reaction products.

5. A process for the production of titanium dioxide which comprises oxidizing a titanium halide, the halogen atom of which has an atomic number greater than nine, in the presence of an oxide of nitrogen, in an amount equivalent to about .5 to 20% by volume of the titanium halide vapor, the balance of the required oxygen being supplied by a gas from the group consisting of air, air enriched by oxygen and oxygen, and recovering the $TiO_2$ from the resulting reaction products.

6. A process for the production of pigment grade titanium dioxide which comprises the oxidation of titanium tetrachloride by a gaseous reagent containing an oxide of nitrogen, in an amount equivalent to about .5 to 20% by volume of the titanium tetrachloride vapor, the balance of the required oxygen being supplied by a gas from the group consisting of air, air enriched with oxygen and oxygen, the gaseous reactants being preheated prior to such oxidation to maintain a reaction temperature of between about 800° and 1350° C., and recovering the $TiO_2$ from the resulting reaction products.

7. In the production of titanium dioxide by the vapor phase oxidation of a vaporous titanium halide, the halogen atom of which has an atomic number greater than nine, the step of effecting the vapor phase oxidation reaction in the presence of an added oxide of nitrogen.

8. In the production of titanium dioxide through the vapor phase oxidation of a vaporous titanium halide, the halogen atom of which has an atomic number greater than nine, the step of adding an oxide of nitrogen to the extent of .5 to 20% of the volume of the titanium halide vapor, with the remainder of the required oxygen being supplied by a gas from the group consisting of air, air enriched by oxygen, and oxygen, and recovering the $TiO_2$ from the oxidation reaction products.

9. A process for the production of pigment quality rutile titanium dioxide which comprises reacting preheated titanium tetrachloride with a preheated gaseous oxygen-containing reagent comprising an oxide of nitrogen, in the amount equivalent to about .5 to 20% by volume of the titanium tetrachloride vapor, the remainder of the required oxygen being supplied by a gas from the group consisting of air, air enriched with oxygen and oxygen, said preheat temperature being sufficient to maintain a reaction temperature of between 800 and 1350° C., removing all reaction products from the reactor, quickly quenching to cool said products, and separating the suspended titanium dioxide from the gaseous products.

10. A process for producing pigmentary $TiO_2$ through the vapor phase oxidation of $TiCl_4$, comprising separately preheating to a temperature above 600° C. $TiCl_4$ and an oxidizing gas from the group consisting of air, air enriched by oxygen, and oxygen, and to which gas an amount of nitrous oxide equivalent to from .5% to 20% by volume of the $TiCl_4$ vapor has been added, mixing said preheated $TiCl_4$ and gas in a reaction zone and effecting their reaction at a temperature in excess of 900° C. and not to exceed 1350° C., removing the resulting reaction products from said zone, subjecting them to quick cooling, and then separating and recovering the $TiO_2$ from said reaction products.

11. A process for producing pigmentary $TiO_2$ through the vapor phase oxidation of $TiCl_4$, comprising separately preheating to a temperature above 600° C. $TiCl_4$ and an oxidizing gas from the group consisting of air, air enriched by oxygen, and oxygen, and to which gas an amount of gaseous nitrogen dioxide equivalent to from .5% to 20% by volume of the $TiCl_4$ vapor has been added, mixing said preheated $TiCl_4$ and gas in a reaction zone and effecting their reaction at a temperature in excess of 900° C. and not to exceed 1350° C., removing the resulting reaction products from said zone, subjecting them to quick cooling, and then separating and recovering the $TiO_2$ from said reaction products.

HOLGER H. SCHAUMANN.

No references cited.